United States Patent
Soldner et al.

(10) Patent No.: US 10,744,860 B2
(45) Date of Patent: Aug. 18, 2020

(54) OUTER SKIN MODULE OF A VEHICLE DOOR AND VEHICLE DOOR HAVING SUCH AN OUTER SKIN MODULE

(71) Applicant: Bayerische Motoren Werke Aktiengesellschaft, Munich (DE)

(72) Inventors: Florian Soldner, Brannenburg (DE); Markus Vallerius, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 87 days.

(21) Appl. No.: 16/197,544

(22) Filed: Nov. 21, 2018

(65) Prior Publication Data

US 2019/0084385 A1 Mar. 21, 2019

Related U.S. Application Data

(63) Continuation of application No. PCT/EP2017/055833, filed on Mar. 13, 2017.

(30) Foreign Application Priority Data

May 25, 2016 (DE) .......................... 10 2016 209 148

(51) Int. Cl.
  *B60J 5/04* (2006.01)
(52) U.S. Cl.
  CPC ........... *B60J 5/0415* (2013.01); *B60J 5/0455* (2013.01)
(58) Field of Classification Search
  CPC ............................ B60J 5/0415; B60J 5/0455
  USPC ...................................................... 296/146.6
  See application file for complete search history.

(56) References Cited

U.S. PATENT DOCUMENTS

| 2006/0290166 A1* | 12/2006 | Gehringhoff | .......... B60J 5/0429 |
| | | | 296/146.6 |
| 2009/0224571 A1 | 9/2009 | Huttsell et al. | |
| 2010/0229470 A1* | 9/2010 | Wikstrom | .............. B60J 5/0405 |
| | | | 49/394 |
| 2014/0246879 A1* | 9/2014 | Ishigame | ............... B60J 5/0443 |
| | | | 296/146.6 |

FOREIGN PATENT DOCUMENTS

| DE | 39 34 590 A1 | 4/1991 |
| EP | 1 688 287 A2 | 8/2006 |

OTHER PUBLICATIONS

International Search Report (PCT/ISA/210) issued in PCT Application No. PCT/EP2017/055833 dated Jun. 16, 2017 with English translation (five pages).
German-language Written Opinion (PCT/ISA/237) issued in PCT Application No. PCT/EP2017/055833 dated Jun. 16, 2017 (five pages).
German-language Search Report issued in counterpart German Application No. 10 2016 209 148.4 dated Jan. 19, 2017 with partial English translation (12 pages).

* cited by examiner

*Primary Examiner* — Joseph D. Pape
*Assistant Examiner* — Dana D Ivey
(74) *Attorney, Agent, or Firm* — Crowell & Moring LLP

(57) ABSTRACT

An outer skin module of a vehicle door has a side impact support for stiffening the vehicle door, a shell-shaped outer skin having a shell edge, and a peripheral mounting frame on its edge, which is connected to the shell edge of the outer skin for fixing the outer skin to a door shell of the vehicle door. The mounting frame and the side impact support are designed as one-piece module components.

5 Claims, 2 Drawing Sheets

OUTER SKIN MODULE OF A VEHICLE DOOR AND VEHICLE DOOR HAVING SUCH AN OUTER SKIN MODULE

CROSS REFERENCE TO RELATED APPLICATIONS

This application is a continuation of PCT International Application No. PCT/EP2017/055833, filed Mar. 13, 2017, which claims priority under 35 U.S.C. § 119 from German Patent Application No. 10 2016 209 148.4, filed May 25, 2016, the entire disclosures of which are herein expressly incorporated by reference.

BACKGROUND AND SUMMARY OF THE INVENTION

The invention relates to an outer-skin module of a vehicle door and to a vehicle door having such an outer-skin module.

In vehicle construction nowadays, vehicle doors are complex structural units which comprise numerous individual parts. Main constituent parts are normally a door bodyshell, outer paneling, which is fitted on the outside of the door bodyshell, inner paneling which is fitted on the inside of the door bodyshell, and numerous add-on parts arranged between the outer paneling and the inner paneling, for example an electric window regulator, a loudspeaker, a side-impact protection device, a locking mechanism for the vehicle door, or the like.

The prior art has already disclosed the practice of designing the outer paneling of the vehicle door in the form of an outer-skin module having an outer skin and having an installation frame which is connected to the outer skin and is intended for fastening the module on the door bodyshell. The outer skin is, for example, a sheet-metal shell made of aluminum and is crimped onto the installation frame at the periphery. The installation frame, which runs all the way around the periphery, ensures precise and reliable fastening of the outer skin on the door bodyshell, since direct fastening of the thin sheet-metal shell is technically problematic on account of the insubstantial sheet-metal thickness of usually approximately 1.2 mm.

The installation frame is usually an aluminum sheet having a sheet-metal thickness of approximately 1.5 mm to 2.0 mm and can be adhesively bonded or screwed to the door body shell.

However, it has been found that such an outer-skin module comprising the shell-shaped outer skin and the installation frame is a very unstable structure on account of the large surface area of the outer skin, and this gives rise to handling problems. Therefore, there is an increase for example, in the outlay required in painting the outer-skin module, since additional stabilizing measures are necessary. Furthermore, the installation frame is fairly complex to produce since the large dimensions mean that the sheet-metal portion which is to be removed from the interior of the installation frame cannot be stamped out in a single procedure step, and therefore has to be removed in a number of steps.

In addition, attempts are being made, in general, to reduce the weight of the vehicle door and to simplify the complex construction of the same.

It is the object of the invention to create a stable outer-skin module which is straightforward to produce, as well as a vehicle door having such an outer-skin module, the vehicle door being straightforward in design and having the lowest weight possible.

This and other objects are achieved according to the invention by an outer-skin module of a vehicle door, having a side-impact beam for strengthening the vehicle door, having a shell-shaped outer skin, which has a shell periphery, and having an installation frame which runs all the way around the periphery, is connected to the shell periphery of the outer skin and is intended for fastening the outer skin on a bodyshell of the vehicle door. The installation frame and the side-impact beam are designed in the form of a single-piece module component.

Integrating the installation frame and the side-impact beam to form a single-piece module component renders the outer-skin module considerably more stable. In addition, there is no longer any need for any separate procedure step in order for the side-impact beam, which is usually provided in any case, to be fastened, in the form of an additional, individual component, on the door bodyshell. Instead, the installation of the side-impact beam now takes place together with the installation of the outer-skin module, in a joint procedure step.

Moreover, the increased inherent rigidity of the outer-skin module provided by the integrated side-impact beam provides for easier transportation and a lower level of outlay required in painting the outer-skin module.

In one embodiment of the outer-skin module, the installation frame of the module component has a frame portion which is adjacent to a window opening of the vehicle door, wherein, along said frame portion, the module component has a waist-rail reinforcement, which is formed-on in one piece and is intended for stabilizing the outer skin module. This waist-rail reinforcement advantageously results in the outer-skin module being further stabilized, and this further improves, for example, the handling of the outer-skin module during transportation or painting. Furthermore, it is usually the case that a waist-rail reinforcement is provided for stabilizing the outer-skin module even in conventional vehicle doors, but this waist-rail reinforcement is designed in the form of a separate component. Integrating the waist-rail reinforcement in a single-piece module component therefore reduces the number of individual components and therefore the installation-related outlay of the vehicle door.

The single-piece module component is preferably a shaped sheet-metal stamped part, in particular made of an aluminum sheet having a sheet-metal thickness of approximately 1.5 mm to 2.0 mm. Proceeding from a conventional installation frame, the side-impact beam and the optionally provided waist-rail reinforcement reduce the dimensions of the sheet-metal portions which are to be stamped out from the interior of the installation frame, and this reduces the complexity of producing the single-piece module component in relation to a conventional installation frame.

The side-impact beam is preferably arranged in the interior of the installation frame and extends more or less linearly between two essentially opposite points of the installation frame. In particular, the side-impact beam extends in a longitudinal direction of the vehicle door, wherein the longitudinal direction of the vehicle door, in the installed state of the latter, corresponds to a longitudinal direction of the vehicle. As an additional scaling measure, attaching a cover panel can be a cost-effective way of modifying the rigidity of the side-impact beam. Particularly efficient passenger protection is thus ensured by the side-impact beam.

According to a further embodiment of the outer-skin module, the module component has at least one stiffening strut, which is formed on in one piece and extends, transversally to a longitudinal direction of the side-impact beam, from the side-impact beam to the installation frame. The stability of the outer-skin module of the vehicle door is advantageously increased by one or more such stiffening struts. In addition, there is a reduction in the dimensions of the sheet-metal portions which are to stamped out from the interior of the installation frame, and therefore the single-piece module component is easier to stamp out of a sheet-metal blank.

In particular, a surface area enclosed by the side-impact beam and the installation frame is subdivided by the at least one stiffening strut into approximately equally sized partial surface areas. These partial surface areas determine the size of the sheet-metal portions which are produced as waste during the stamping-out operation of the module component. The smaller the sheet-metal portions, the more likely is it that the module component can be stamped out in just a single procedure step.

The at least one stiffening strut is preferably connected, in particular adhesively bonded, to the outer skin, at least in part, between the side-impact beam and the installation frame. This means that the outer skin is fixed by the at least one stiffening strut and therefore prevented from buckling. These additional supports mean that it is no longer the entire surface area, but only a number of small partial surface areas, of the outer skin which are subjected to buckling stress, and it is therefore advantageously possible for the buckling strength, and thus the thickness of the outer skin to be reduced.

The shell-shaped outer skin is preferably a metal sheet, in particular an aluminum sheet, the sheet-metal thickness particularly preferably being less than 1 mm. It is possible for the sheet-metal thickness to be reduced in relation to a conventional outer skin, in particular, on account of the additional fixing of the outer skin on the side-impact beam, of the at least one optional stiffening strut and/or of the optional waist-rail reinforcement.

In order to increase the rigidity and strength of the outer-skin module further, it is possible for the shell-shaped outer skin to have its shell periphery welded, in particular laser-welded, to the installation frame all the way around. As an alternative, however, it is also contemplated for the shell periphery and the installation frame to be connected to one another by crimping and adhesive bonding all the way around.

In addition, the invention also covers a vehicle door having an above-described prefabricated outer-skin module and a door bodyshell, on which the prefabricated outer-skin module is fastened, wherein the outer-skin module, in particular the installation frame of the outer-skin module, is screwed to the door bodyshell. As a result of the installation frame being designed in the form of a module component with add-on parts integrated in a single piece, the screw connection means that the side-impact beam and the optional waist-rail reinforcement are also fastened on the door bodyshell at the same time as the shell-shaped outer skin, and this advantageously simplifies the assembly of the vehicle door. The assembly can be further simplified by off-tool or system-based fitting. As far as the off-tool referencing is concerned, it is also possible to provide for removal and attachment with repeated accuracy in the event of servicing, it therefore being possible to close the maintenance openings in the inner part of the door.

According to one embodiment of the vehicle door, the installation frame is adhesively bonded to the door bodyshell all the way around. While the screw connection between the outer-skin module and the door bodyshell ensures a firm and reliable connection, the adhesive bonding serves predominantly for sealing and sound-installation purposes.

The door bodyshell is preferably a plastic component, in particular fiber-reinforced plastic component. Such plastic components, along with a low weight, have a high strength and can be formed, and produced, with a low level of outlay by injection molding.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
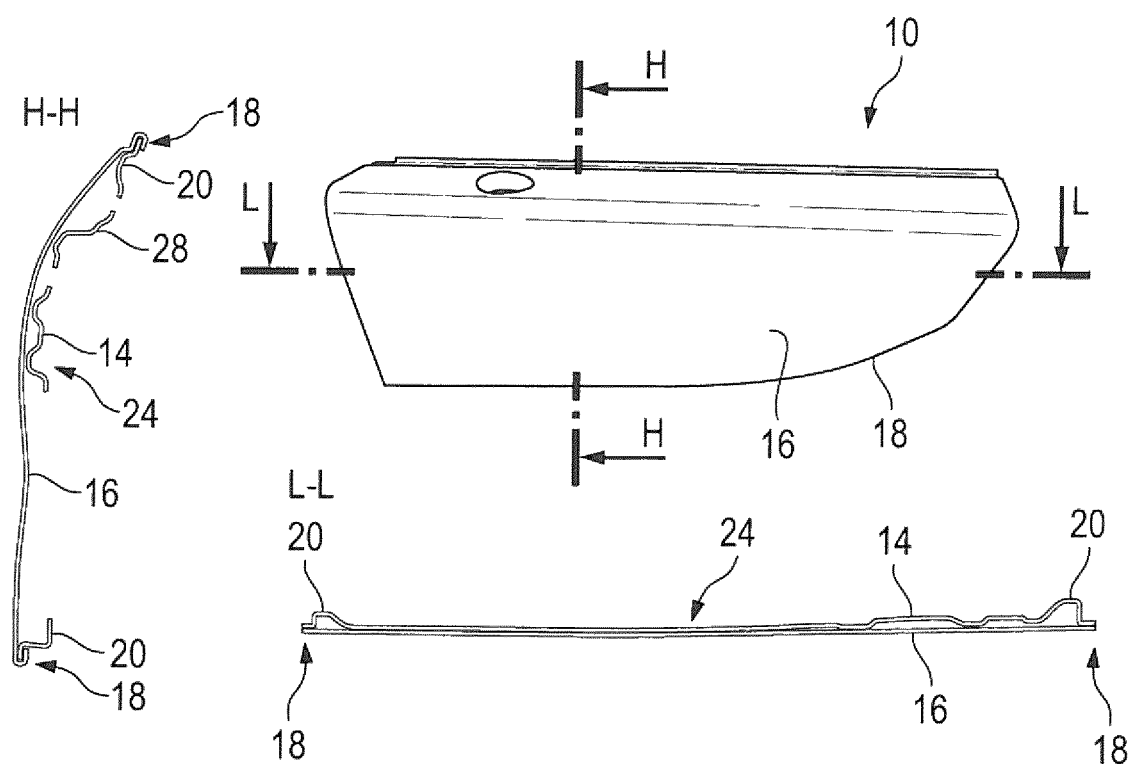
FIG. 1 shows an exterior view, and also a longitudinal section view and a cross section view of a vehicle-door outer-skin module according to an embodiment of the invention.
Figure 2:
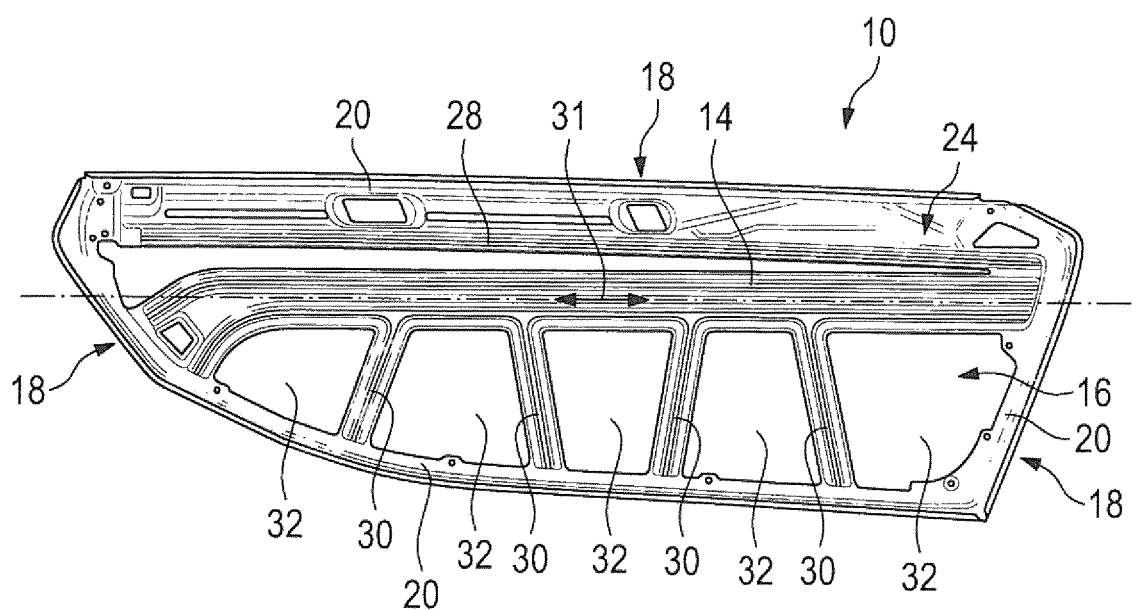
FIG. 2 shows an interior view of the outer-skin module of FIG. 1.

FIGS. 1 and 2 illustrate an outer-skin module 10 of a vehicle door 12. FIG. 1 shows an exterior view, a longitudinal section view L-L and a cross section view H-H. FIG. 2 shows an interior view of the outer-skin module 10.

According to FIG. 2, the outer-skin module 10 includes a side-impact beam 14 for strengthening the vehicle door 12, a shell-shaped outer skin 16 which has a shell periphery 18, and an installation frame 20 which runs all the way around the periphery, is connected to the shell periphery 18 of the outer skin 16 and is intended for fastening the outer skin 16 on a bodyshell 22 (see FIG. 3) of the vehicle door 12.

Since, in the installed state of the outer-skin module 10, the usually painted outer side of the outer skin 16 (said outer side being illustrated in FIG. 1) forms a vehicle surface which is visible from outside the vehicle, the outer skin 16 has to meet stringent requirements with respect to its surface quality. In order to meet these requirements, the shell-shaped outer skin 16, in the exemplary embodiment illustrated, is a metal sheet, in particular an aluminum sheet.

FIG. 2 shows clearly that the installation frame 20, which extends all the way around the periphery, and the side-impact beam 14 are designed in the form of a single-piece, non-welded module component 24. This module component 24 here is a shaped sheet-metal stamped part, wherein, for reasons relating to weight, use is preferably made of an aluminum sheet having a sheet-metal thickness on the order of magnitude of approximately 1.5 mm to 2.0 mm. As an alternative, however, it is also contemplated to use a steel sheet.

According to FIG. 2, the side-impact beam 14 is arranged in the interior of the installation frame 20 and extends more or less linearly between two essentially opposite points of the installation frame 20.

According to FIG. 2, the installation frame 20, which, in relation to the shell periphery 18 of the outer skin 16, runs all the way around the periphery, rests on the outer skin 16 and has its outer periphery connected to the shell periphery 18. In specific terms, the shell periphery 18 and the installation frame 20 here are fastened on one another by crimping and adhesive bonding all the way around.

As an alternative, however, it is also contemplated for the shell-shaped outer skin 16 to have its shell periphery 18 welded, in particular laser-welded, to the installation frame 20 all the way around, in order for the strength and rigidity of the outer-skin module 10 to be increased.

Figure 3:
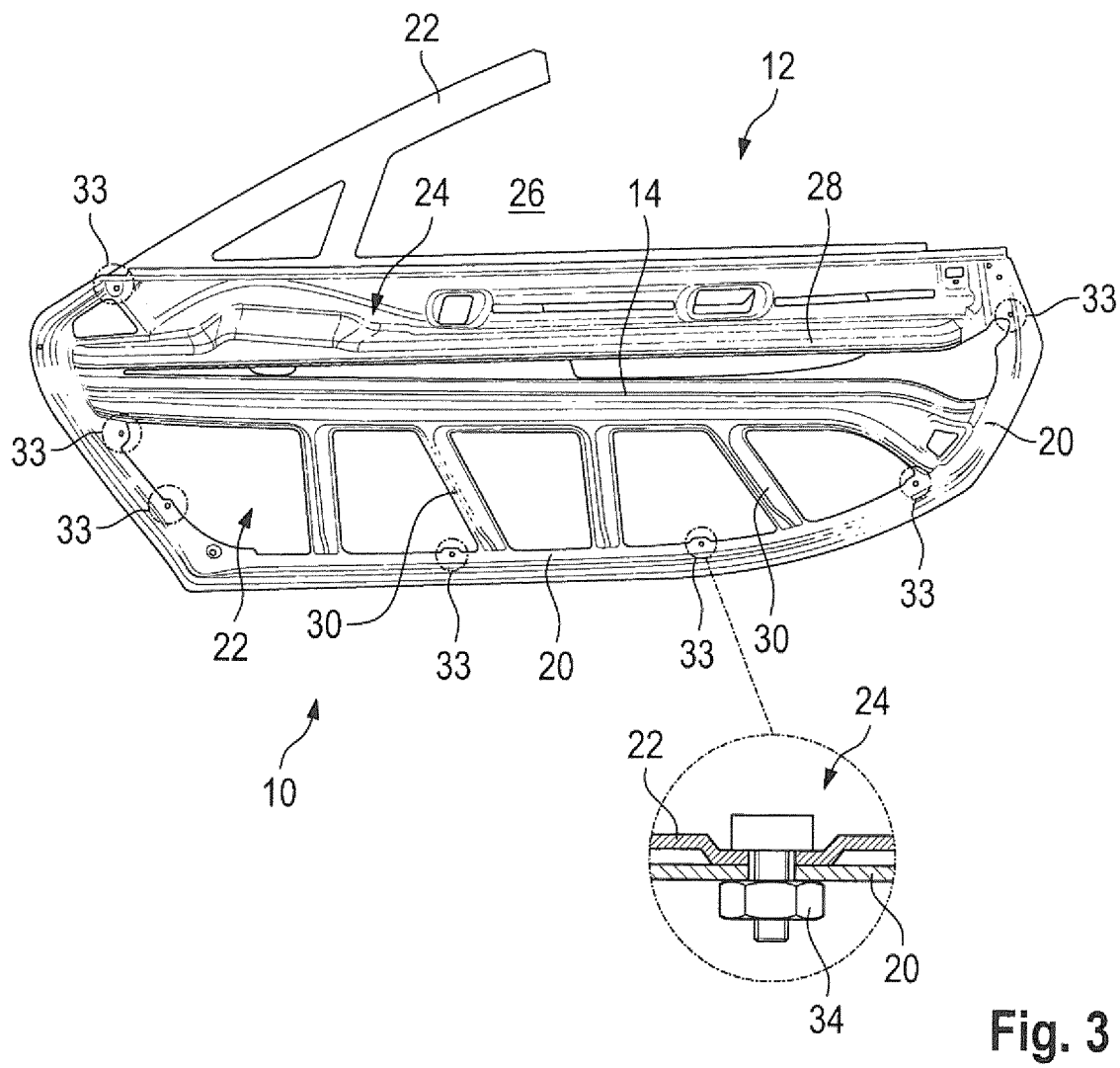
FIG. 3 shows an exterior view of a vehicle door having the outer-skin module according to FIGS. 1 and 2, with the outer skin removed.

The installation frame 20 of the module component 24 has a frame portion which is adjacent to a window opening 26 of the vehicle door 12, said window opening being indicated in FIG. 3, wherein, along said frame portion, the module component 24 has a waist-rail reinforcement 28, which is formed-on in one piece and is intended for stabilizing the outer-skin module 10.

The waist-rail reinforcement 28 here, just like the side-impact beam 14, is an essentially linear reinforcement portion of the module component 24.

Section H-H of FIG. 1 shows clearly that the side-impact beam 14 and the waist-rail reinforcement 28 are profiled such that, as seen in cross section, they abut only in part, rather than over their entire surface area, against the shell-shaped outer skin 16. The stabilization of the outer-skin module 10, here is attributable predominantly to the profile regions which run, as seen in cross section, obliquely or transversally to the shell surface of the outer skin 16.

The linear side-impact beam 14 extends in a longitudinal direction 31 between two essentially opposite points of the installation frame 20, wherein section L-L of FIG. 1 shows clearly that the side-impact beam 14 abuts over most of its longitudinal extent, in particular over more or less its entire length, directly against the outer skin 16. This also applies analogously to the waist-rail reinforcement 28.

According to FIG. 2, the module component 24 has four stiffening struts 30, which are formed-on in one piece and extend, transversally to the longitudinal direction 31 of the side-impact beam 14, from the side-impact beam 14 to the installation frame 20. The surface area enclosed by the side-impact beam 14 and the installation frame 20 is subdivided here by the four stiffening struts 30 into five approximately equally sized partial surface areas 32. During production of the single-piece module component 24, these partial surface areas 32 determine the size of the sheet-metal portions which are produced as waste during the stamping-out operation of the module component 24. As the size of the pieces of waste decreases, there is reduction in the complexity of producing the module component 24, since, beneath a predetermined limit size, the sheet-metal portions can be removed in a single stamping step. In geometrically advantageous configuration, it is therefore possible for the entire single-piece module component 24 to be stamped out of a sheet-metal blank in just a single procedure step.

In order to reduce buckling stress of the shell-shaped outer skin 16, the stiffening struts 30 are connected, in particular adhesively bonded, to the outer skin 16, at least in part, but preferably over their entire length, between the side-impact beam 14 and the installation frame 20. The adhesive used is, for example, an expansible foam which expands under increased temperatures, as occur for example during the operation of baking the paint in the facility for painting the outer-skin module 10. The expandable foam then reliably prevents undesirable scraping or rattling noises from occurring in the case of small relative movements between the outer skin 16 and the module component 24.

The adhesive also fixes the outer skin 16 on the stiffening struts 30, the outer skin 16 therefore having an additional support, in particular, in a direction transverse to the shell surface, within the installation frame 20 which runs all the way around the periphery. This means that the outer skin 16 need only freely span relatively small partial surface areas 32, and therefore the requirements which have to be met by the buckling stress of the outer skin 16 are reduced. Consequently, a sheet-metal thickness of the shell-shaped outer skin 16 can be reduced to less than 1 mm, as a result of which it is advantageously possible to cut back on the amount of material used and thus also to reduce the weight of the vehicle door 12.

For the same reasons as with the stiffening struts 30, it is also possible as an alternative, or in addition, for the side-impact beam 14 and/or the waist-rail reinforcement 28 to be connected, in particular adhesively bonded by expandable foam, to the outer skin 16, at least in part, but preferably over their entire length.

This gives rise to a prefabricated outer-skin module 10 which is not complex to produce and, on account of the integrated side-impact beam 14 and the integrated waist-rail reinforcement 28, has a high level of inherent rigidity, which in turn results in advantages in relation to the handling of the outer-skin module 10.

The stiffening struts 30, which are additionally integrated in the module component 24 and connected to the outer skin 16, ensure a relatively low level of buckling stress of the outer skin 16 and thus allow the sheet-metal thickness of the outer skin 16 to be reduced to less than 1 mm. The reduced sheet-metal thickness here readily compensates for the additional weight due to the stiffening struts 30 and can even result overall in a lower overall weight of the vehicle door 12.

FIG. 3 shows the vehicle door 12 having the prefabricated outer-skin module according to FIGS. 1 and 2 and also a door bodyshell 22, on which the prefabricated outer-skin module is fastened. The outer skin 16 of the outer-skin module 10 is not illustrated in FIG. 3, so that the connection between the outer-skin module 10 and the door bodyshell 22 can be made visible.

In the exemplary embodiment, the outer-skin module 10, in particular the installation frame 20 of the outer-skin module 10, is screwed to the door bodyshell 22 at a number of locations 33, which are called out in an expanded view in FIG. 3.

The screw connection is illustrated schematically in a detail shown in FIG. 3, wherein a nut 34 of the screw connection has been designed in particular, in the form of a pierce nut and has been preassembled on the installation frame 20.

In addition to the screw connection, in the exemplary embodiment illustrated, the installation frame 20 is adhesively bonded to the door bodyshell 22 all the way around. The adhesive bonding here has a sound-insulating and sealing effect and prevents moisture or dirt from being able to penetrate into the interior of the vehicle door 12.

According to FIG. 3, the door bodyshell 22 is a plastic component, specifically a carbon-fiber-reinforced plastic component, which, along with low weight, has a high strength and, furthermore, can easily be produced by injection molding.

As an alternative, however, it is also possible for the door bodyshell 22 to be produced from metal, in particular from aluminum or steel.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle door, comprising:
a prefabricated outer-skin module; and
a door shell configured to be connected with the prefabricated outer-skin module with fasteners and connected to a body of a vehicle,
wherein
the prefabricated outer-skin module includes
a shell-shaped outer skin having a shell periphery,
a single-piece, unwelded installation frame in the form of a stamped sheet metal part, the installation frame being connected around the shell periphery to the outer skin, and being configured to fasten the outer skin on the door shell of the vehicle door,
a side-impact beam integrally formed with the installation frame for strengthening the vehicle door,
at least one stiffening strut integrally formed with the installation frame, the at least one integrally stiffening strut
extending from the side impact beam to the mounting frame in a direction transverse to a longitudinal direction of the side impact beam, being arranged in a surface area between the side-impact beam and the installation frame such that the surface area is subdivided by the at least one stiffening strut into essentially equally sized partial surface areas, and
is at least in sections adhesively bonded to the outer skin.

2. The vehicle door as claimed in claim 1, wherein the installation frame has a frame portion which is adjacent to a window opening of the vehicle door.

3. The vehicle door as claimed in claim 1, wherein the side-impact beam is arranged in an interior of the installation frame and extends essentially linearly between two essentially opposite points of the installation frame.

4. The vehicle door as claimed in claim 1, wherein the shell-shaped outer skin has a sheet-metal thickness of less than 1 mm.

5. The vehicle door as claimed in claim 1, wherein the shell-shaped outer skin has its shell periphery welded to the installation frame all the way around.

* * * * *